United States Patent Office 3,285,149
Patented Nov. 15, 1966

3,285,149
PHOTOGRAPHIC CAMERA
Paul Fahlenberg, Baierbrunn, Franz Singer, Munich, and Rudolf Lang, Nettelkofen, near Grafing, Germany, assignors to Compur-Werk Gesellschaft mit beschrankter Haftung & Co., Munich, Germany, a German firm
Filed Dec. 8, 1964, Ser. No. 416,846
Claims priority, application Germany, Dec. 12, 1963, C 31,666; Mar. 6, 1964, C 32,342; Apr. 21, 1964, C 32,700
18 Claims. (Cl. 95—10)

This invention relates to a photographic camera, and more particularly to a camera which has an exposure meter and in which one of the factors determining the exposure is set in accordance with the reading of the exposure meter. More particularly, the preferred form of the invention relates to such a camera in which the exposure meter unit is bodily rotatable or turnable.

It is well known in the photographic art that the movable member of an exposure meter has a uniform or linear deflection, corresponding exactly to the variations in the amount of light, over only a limited range, while the marginal areas at each end of this limited range involve noticeable deviations from the linear characteristics which are present in the above mentioned limited range. As a result, it is very difficult in practice to adapt the limited range of linear deflection to two adjacent detecting or scanning ranges used in setting the variable exposure factor, such as, for example, a detecting range to be used in daylight exposures and a detecting range to be used in flashlight exposures.

An object of the present invention is to eliminate this disadvantage and to provide an optimum utilization of the indicating range of the exposure meter.

Another object is the provision of a construction having the advantages just mentioned, which at the same time can be made with relatively simple, inexpensive, and compact constructional elements or parts.

Still another object is the provision of a generally improved and more satisfactory arrangement for setting a variable exposure factor from or in accordance with the reading of an exposure meter.

A further object is the provision of an exposure setting arrangement which is adjustable over one range for daylight exposures, to produce different exposure times, and adjustable over another range for flashlight exposures, preferably with constant exposure time, and which can be coupled throughout both ranges to a control cam so formed that an ascending part of the cam is effective in one range, and a descending part thereof is effective in the other range, to engage a member for turning the exposure meter unit.

A still further object is the provision of a control cam of easily manufactured symmetrical heart shaped form, for use in an arrangement such as above described.

These and other desirable objects may be attained in the manner disclosed as an illustrative embodiment of the invention in the following description and in the accompanying drawings forming a part hereof, in which.

Figure 1:
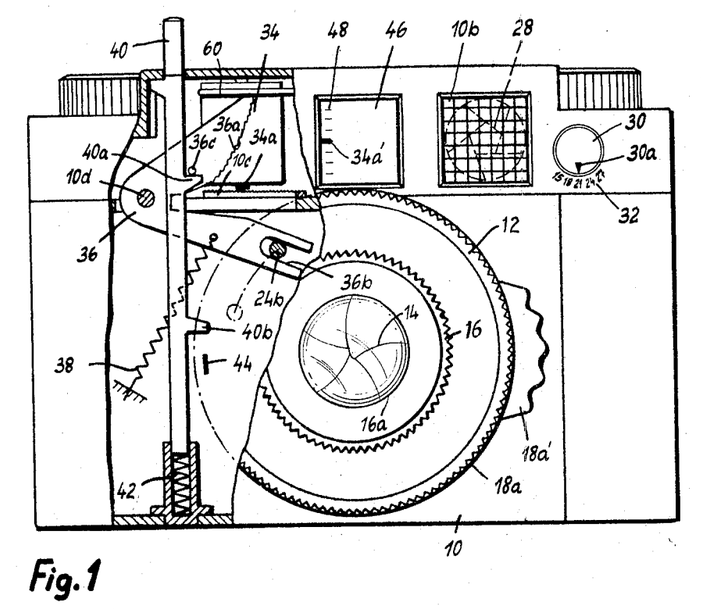
FIG. 1 is a front elevational view of a camera in accordance with a preferred embodiment of the invention, with parts broken away and parts shown in vertical section.
Figure 2:
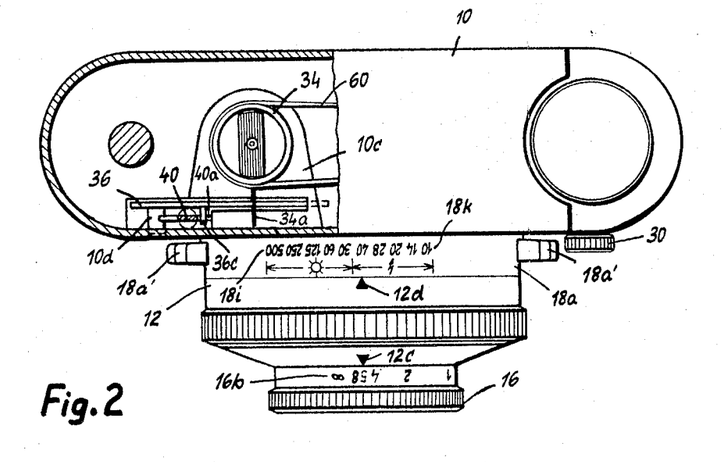
FIG. 2 is a top plan view of the same, with parts broken away and parts in horizontal section.
Figure 4:
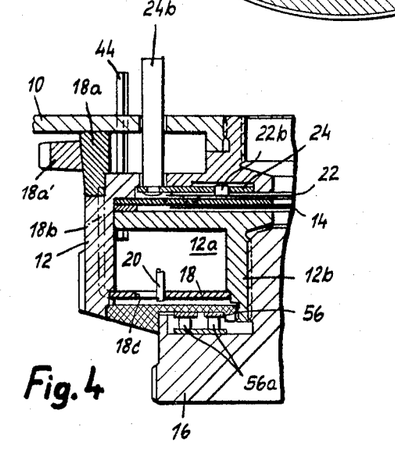
FIG. 4 is a fragmentary radial section taken axially through part of the shutter.

Referring now to the drawings, the camera illustrated in general in FIGS. 1 and 2 is of conventional construction except for the features specifically described in this application. It comprises, for example, a conventional housing or casing 10 having mounted on the front wall thereof an objective shutter indicated in general at 12. In the usual annular space 12a (FIG. 4) within the shutter casing there is the usual conventional mechanism for actuating the shutter blades 14 in their opening and closing movements. Mounted for focusing adjustment in an axial direction, on the front lens tube 12b of the shutter, is the focusing mount 16 which carries one or more lens components in known manner. A focus distance scale 16b (FIG. 2) is marked circumferentially on the focusing mount 16 and is read in conjunction with a fixed mark or reference point 12c on the shutter casing, to indicate the distance for which the camera is focused at any particular time.

A control ring 18 (FIG. 4) is mounted within the shutter housing for rotation about the optical axis (that is, the central axis passing through the front lens tube 12b) as a center, and the adjustment of this ring 18 in a rotary direction serves to set the shutter mechanism for the required exposure time, as is conventional and well understood in the art. The example, the control ring 18 may have the usual cam slot 18c, partially shown in FIG. 4, which cooperates with a setting pin 20 of the shutter delaying or retarding mechanism to determine the length or speed of the exposure. The control ring 18 is coupled by means of an arm 18b (FIG. 4) to the external setting ring 18a (FIGS. 2 and 4) which may be manually rotated to set the exposure to a desired speed or to other desired conditions such as for flashlight photographs under various conditions. Manual rotation of the setting ring 18a is facilitated by the provision of finger grip portions 18a' on diametrically opposite sides of the ring 18a.

The setting ring 18a is provided on its periphery with a shutter speed scale 18i and with a flash guide number scale 18k. Both scales are read in conjunction with a reference point or fixed mark 12d on the periphery of the shutter housing 12. Any desired graduation of either scale may be brought opposite the reference mark 12d by suitably turning the ring 18. To indicate which scale is which, and to avoid the possibility of confusion between them, the shutter speed scale may have a suitable symbol opposite it, such as the sunlight symbol illustrated in FIG. 2, and the flash guide number scale may have a lightning flash symbol associated with it, as shown.

Figure 3:
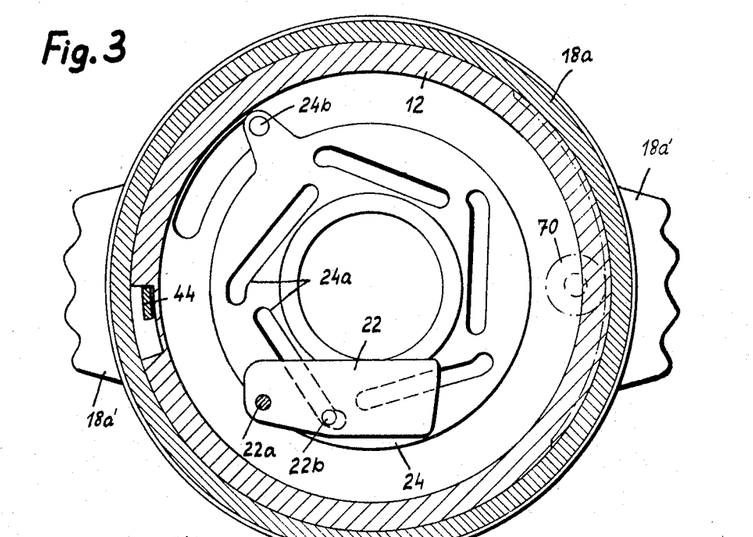
FIG. 3 is a vertical section through the shutter of the camera shown in FIGS. 1 and 2.

Mounted within the shutter casing 12 is an iris diaphragm, having a plurality of leaves 22 arranged in the annular space behind the shutter blades 14. For the sake of clarity, only one of the diaphragm leaves 22 is illustrated in FIG. 3, but those skilled in the art will recognize that several leaves are provided, five of them being provided in the construction here illustrated, and all are identical with each other. Each diaphragm leaf has a bearing pin 22a fitting in a bearing in the shutter housing, and a control pin 22b engaging in a control slot 24a of a control ring 24 (FIGS. 3 and 4) which has a pin 24b (FIGS. 1, 3, and 4) extending rearwardly in a direction parallel to the optical axis.

Incorporated in the camera 10 is a photoelectric exposure meter of known kind. It comprises, for example, a photoresponsive element shown schematically at 26 in FIG. 5, located behind a window 10b (FIG. 1) in the front wall of the camera. This photo element 26 may be either a photocell or a photoresistance, in either case of conventional known kind. If it is a photocell it will, as usual, supply the necessary current for operation of the exposure meter and related mechanism. If it is a photoresistance, it will serve to control the flow of current supplied by some other source, such as a battery. The term photo element as here used is intended generically to include both a photocell and a photoresistance.

Figure 5:
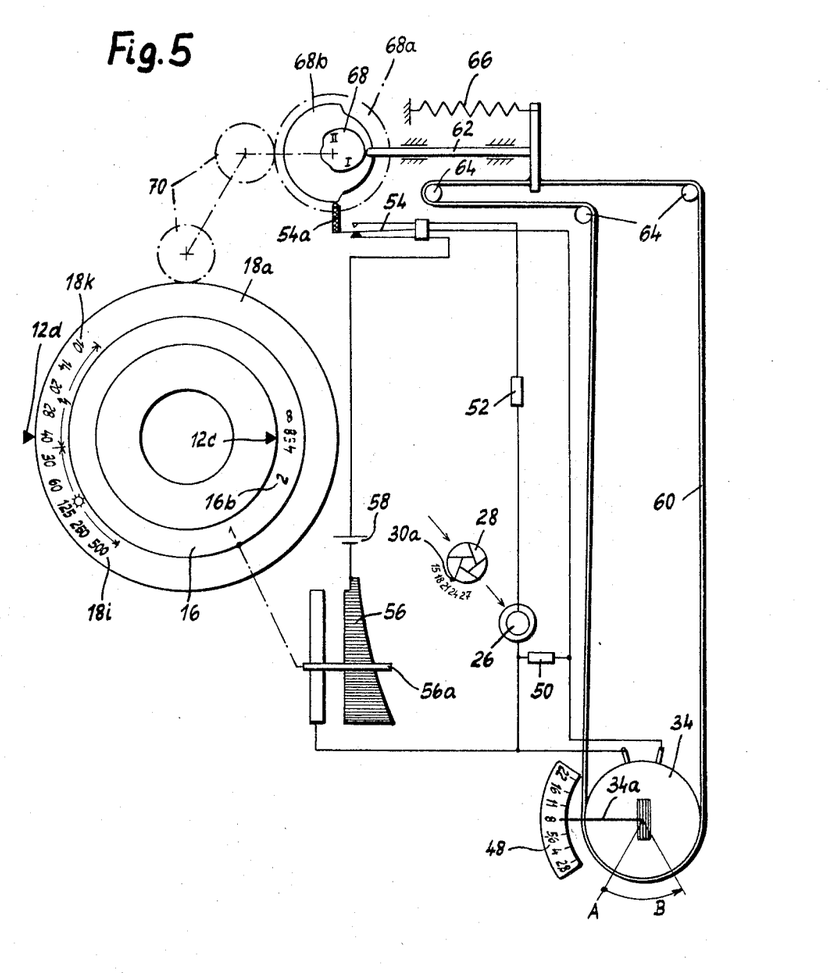
FIG. 5 is a combined wiring diagram and schematic view illustrating the preferred form of the invention.

Arranged in front of the photo element 26 is a light restrictor, for example an iris diaphragm 28 (FIGS. 1 and 5) operatively connected to a setting knob 30 (FIGS. 1 and 2) by conventional connecting means, not shown. A film speed scale or film sensitivity scale 32 is associated with the knob 30, as shown in FIGS. 1 and 5, and is read in conjunction with a reference point 30a on the knob 30. By turning the knob to bring the point 30a opposite the proper graduation of the scale 32, the size of the aperture of the restrictor diaphragm 28 is altered, thereby feeding into the system the factor of film sensitivity.

The light meter mechanism itself is indicated in general at 34 and has a movable pointer 34a, movable in response to variations in the electric current flowing through the coil of the meter, in the conventional known manner. The entire meter 34 is rotatable as a unit, on an axis coincidental with the axis of rotation of the pointer 34a. As the pointer 34a moves, either as a result of variations in the electric current or as a result of bodily turning the entire meter, the pointer sweeps over a fixed clamping jaw 10c. Associated with the pointer is what may be called a feeler device or detector device, including a pivoted lever 36 which is mounted on a fixed pivot 10d in the camera housing 10, and a spring 38 tends to turn the feeler lever in a clockwise direction when viewed from the front as in FIG. 1. The first arm of the lever is of stepped formation as shown at 36a, and comes down, under the influence of the spring 38, onto the top of the meter pointer 34a, slightly depressing or flexing the pointer to firm engagement with the fixed clamping jaw 10c. The extent to which the feeler lever 36 can turn clockwise from its initial starting position depends upon the position, at the moment, of the pointer 34a. The feeler lever is in the general form of a bellcrank, the first arm of which constitutes the stepped detector cam portion 36a above mentioned, while the second arm of the bellcrank is bifurcated at 36b to receive the previously mentioned pin 24b on the diaphragm control ring 24.

A pin 36c on the lever 36 overlies a shoulder 40a on a release slide or plunger 40 vertically movable in the camera casing but held against rotation therein, and urged upwardly by a spring 42 which is more powerful than the spring 38. Thus, unless manually depressed, the spring 42 will hold the plunger 40 at its upward limit of motion, and the shoulder 40a whereon, acting through the pin 36c, will hold the feeler lever 36 in its counterclockwise limit position, against the force of the spring 38. When manual finger pressure on the top of the plunger 40 depresses this plunger against the force of the spring 42, the shoulder 40a moves downwardly, thereby allowing the spring 38 to swing the feeler lever 36 in a clockwise direction as far as permitted by the then position of the meter pointer 34a. The pointer stops the further clockwise motion of the lever 36, but the plunger 40 continues on downwardly until finally, near the end of its downward movement, a second shoulder 40b on the plunger engages the shutter release member schematically shown at 44, thus releasing the shutter for an exposure-making operation. But meanwhile, before the shutter is released or tripped to make the exposure, the feeler lever 36 has swung to a position dependent upon the setting of the meter pointer 34a, and this swinging of the lever 36 has, through the pin 24b, caused a counterclockwise swinging of the diaphragm ring 24, closing down the diaphragm leaves from the initial maximum aperture to the particular aperture determined by the position of the meter pointer 34a. Therefore the exposure is made at the particular diaphragm aperture determined by the position of the meter pointer 34a.

Preferably the pointer 34a of the exposure meter is reflected by optical means, known in the art, to form an image of the pointer in the direct vision viewfinder 46 of the camera, as shown at 34a' in FIG. 1. A diaphragm aperture scale 48 is preferably associated with the pointer so that when the user looks through the viewfinder, he sees both the pointer and the scale, and can determine at what diaphragm aperture the exposure will be made, under the prevailing conditions of illumination and setting of the variable factors.

FIG. 5 illustrates the electrical wiring of the system, as well as giving a schematic illustration of various mechanical parts. The photo element 26 is connected by means of two resistances 50 and 52, and a switch 54, with the circuit of the moving coil or other current-responsive part of the exposure meter 34, when the switch 54 is in one position. On the other hand, when the setting of the switch 54 is shifted to a different position, then the photo element 26 is cut out of the circuit, and instead, a selectively variable resistance 56 with battery 58 is connected into the circuit of the exposure meter 34. The sliding contact 56a of the variable resistance 56 is operatively connected to the focusing mount 16 of the lens, as indicated schematically, in such manner that the circuit resistance offered by the variable resistance 56 is dependent upon the focus distance which is set by the focusing mount 16.

The housing of the exposure meter is surrounded by a band or belt 60 the ends of which are firmly connected to a pin 62. In appropriate places, the band or belt passes over guiding rollers 64. The pin is movably mounted in the camera housing and is loaded by a spring 66 pulling the pin leftward when viewed as in FIG. 5, thereby striving to hold the left end of the pin against the periphery of a control cam 68 which is in the form of a symmetrical heart cam and is secured to a carrier 68a which has gear teeth on its periphery. The gear teeth on the carrier are engaged, through a gearing drive 70, with internal teeth on the exposure speed or time setting member 18a.

A switch cam 68b is also mounted on the carrier 68a to turn therewith, and acts on an insulating pin 54a on the switch 54, in such a way that the photo element 26 is operatively connected in the circuit of the exposure meter 34 when any part of the shutter speed scale 18i is opposite the index mark 12d, but when any part of the flash guide number scale 18k is opposite the index mark 12d, then the photo element 26 is operatively disconnected from the circuit of the meter 34 and, instead, the variable resistance 56 is operatively connected into the meter circuit.

The graduation of the scales 18i and 18k and the inclination of the heart cam 68 are so related to each other and to the characteristics of the exposure meter 34 that in daylight exposures, a correct setting of the diaphragm aperture is assured, taking into account the factors of object brightness or illumination, fed into the system through the photo element 26, and film speed or film sensitivity fed into the system through adjustment of the knob 30, and exposure time or shutter speed fed into the system by adjustment of the adjusting ring 18a which in turn adjusts the position of the heart cam 68 which acts on the pin 62 to control the position of the band or belt 60 and thereby to determine the orientation of the entire rotatable meter unit 34.

When making a manually timed daylight exposure, that is, an exposure wherein one of the graduations on the scale 18i is brought opposite the index mark 12d, the previously mentioned cam 18c operatives on the control pin 20 of the delaying or retarding mechanism to produce an exposure of the speed or duration indicated by that part of the scale 18i which is opposite the mark 12d. When the ring 18a is turned to bring the scale 18k opposite the mark 12d, the cam 18c acts on the pin 20 to hold the delaying mechanism at a constant shutter speed or duration of exposure throughout the entire range of the scale 18k, preferably a shutter speed of $\frac{1}{30}$ of a second, as this exposure speed is slow enough for flash purposes and yet fast enough to produce a good photograph when the camera is held reasonably steady in the hand, without the need for placing it on a tripod or other fixed support. Thus, as will be understood by those skilled in this art, the shutter speed control cam 18c has a radial rise in those portions of the cam which will be opposite the control pin 20 when the scale 18i is opposite the mark 12d, and this part of the cam is preferably so shaped as to give various shutter speeds from $\frac{1}{30}$ to $\frac{1}{500}$ of a second. The part of the cam which will be opposite the control pin 20 when the scale 18k is brought opposite the mark 12d has no radial rise and is a circumferential extension of the $\frac{1}{30}$ second part of the cam. The variable resistance 56, and the inclination of the heart cam 68 are so related to each other and to the graduations of the focus distance scale 16b and to the characteristics of the exposure meter, that in flashlight exposures, there is always the well known relationship, namely, the flash guide number equals the focus distance multiplied by the diaphragm aperture; or, expressing the same relationship slightly differently, the diaphragm aperture is equal to the flash guide number divided by the focus distance. This relationship is, of course, very well known in the art of flash photography, and it is only necessary to mention that this relationship is to be observed when designing the electrical characteristics of the variable resistance 56 and designing the shape of the cam 68.

The camera as described above with reference to FIGS. 1–5 of the drawings is operated as follows:

The parts are illustrated as set for a flash exposure, the ring 18a being set to a suitable flash guide number such as "40." The turning of the ring 18a to this position (or to any other position for flash photography) automatically sets the shutter speed at $\frac{1}{30}$ of a second. The shutter itself is tensioned or cocked in the conventional manner, usually by operating the film winding knob which is connected to the shutter tensioning mechanism.

When the ring 18a is set to the position indicated by the flash guide number "40," the carrier 68a is turned through the gearing connection 70, and the heart cam 68 turns with it to a position such that the end of the pin 62 lies closely beneath the apex of the heart cam in the range of its periphery indicated in FIG. 5 at I. This causes longitudinal movement of the pin 62 and moves the belt or band 60 connected therewith, to swing the meter unit 34 in the direction shown by the arrow B in FIG. 5, from an initial position schematically indicated at A. If the ring 18a is set to a different guide number instead of the guide number "40" above mentioned as an example, the shape of the cam 68 will cause the pin 62 to move to a different position, operating the band 60 to turn the meter 34 to a different position, responsive to the new guide number. As well understood in the art, the flash guide number depends upon the type of flash bulb which is used and the type of reflector in which it is used, and also upon the film speed or sensitivity. The setting of the ring 18a to any one of the flash guide number positions also operates the cam 68b as above explained, so that the photo element 26 is taken out of the electric circuit to the meter, and the variable resistance 56 is introduced into such circuit.

If the focusing ring 16 of the camera is now set for the proper focus distance from the camera to the principal object to be photographed, this will move the slider 56a along the variable resistance 56, to introduce into the electric circuit an amount of resistance dependent upon the focus distance. For example, assuming that the ring 18a has been set for a flash guide number of "40" and that the focusing mount 16 is set for a focus distance of five meters (these settings being illustrated in FIGS. 2 and 5) the amount of resistance introduced into the circuit, with reference to the constant power of the battery 58, will cause the pointer 34a of the meter 34 to deflect to a position corresponding to the diaphragm aperture of $f8$, which is the position of the pointer illustrated in FIG. 5. This position of the pointer will show through the viewfinder 46, with reference to the scale 48, so that in advance of taking the picture the operator will know at what diaphragm aperture it will be taken.

When the release plunger 40 is now operated, the cam edge 36a of the detector lever 36 will first swing down into the detecting position with respect to the pointer 34a, thus bringing the diaphragm leaves 22 from maximum aperture position to an aperture corresponding to $f8$. Then further downward motion of the plunger 40 will release the shutter trigger or trip member 44, initiating the exposure, the diaphragm meanwhile remaining in the position of $f8$. Thus the flash photograph is taken with automatic setting of the diaphragm corresponding to the factors of flash guide number and focus distance, which have been appropriately fed into the mechanism.

If it is desired to take a daylight picture rather than a flash photograph, the setting ring 18a is turned to set a desired shutter speed from the scale 18i opposite the reference mark 12d. This turns the heart cam 68 so that the portion of the periphery indicated at II in FIG. 5 now cooperates with the end of the pin 62, instead of the portion I. Again the band 60 is moved to turn the exposure meter 34 in the direction of the arrow B as the end of the pin 62 rides down the slope from the apex of the cam 68 to a position in the region II, depending upon the position to which the ring 18a is set. Also, the rotation of the carrier 68a has caused the cam 68b to shift the switch 54 so that the variable resistance 56 is now out of the circuit and the photo element 26 is in the circuit.

Assuming that the film speed or sensitivity has been set by turning the knob 30, the shutter is tensioned or cocked, as for example by operating the film feeding or transport device. When the operator points the camera toward the object to be photographed, the amount of light corresponding to the brightness of the object is restricted by the restrictor 28 in accordance with the setting of the film speed, and the restricted light reaches the photo element 26 and thus controls the electric circuit of the meter to cause the pointer 34a to swing to a position indicating the correct diaphragm aperture setting to be used under the prevailing conditions of film sensitivity, shutter speed, and illumination of object. Again the aperture at which the photograph will be made can be read in advance of taking the photograph, by looking into the viewfinder 46 where the operator will see the scale 48 and an image of the pointer at 34a'. Downward motion of the releasing plunger 40 operates, as before, just as in the case of a flash photograph, first to set the diaphragm to the aperture indicated by the position of the pointer 34a, and then to trip or release the shutter to make the actual exposure while maintaining the diaphragm at the indicated aperture.

The two cam sections I and II of the heart cam 68 in accordance with the present invention have the effect that, regardless of whether the ring 18a is turned from a central position to one of the daylight exposure positions on one side of the central position, or to one of the flash exposure positions on the other side of the central position, in either case the meter 34 is always turned in the direction of the arrow B from its initial position A, since the pin 62 rides on the high spot or apex of the heart shaped cam 68 when the setting ring 18a is in its central position. The angular range of indication and hence the turning of the meter is consequently utilized twice, so to speak. In practice, therefore, there is the advantage that it is only necessary to make the angular range of the measuring device or meter such that, for safety reasons, it exceeds the diaphragm range at both ends thereof by only one or two diaphragm intervals. Moreover, with the adjusting arrangement according to the present invention, each of the setting members 16, 18a, and 30 can be actuated and set individually by hand, which gives a particularly simple form of the camera from a constructional point of view.

Known means well understood in the art may be used to prevent the release or triggering of the camera, to initiate an exposure operation, if the pointer of the exposure meter is outside of the proper indicating range; in other words, if under the prevailing light conditions or other prevailing conditions of settable factors, the diaphragm aperture theoretically required could not be actually set on the diaphragm.

It has already been mentioned above that the photo element 26 may be either a photocell, furnishing its own current in response to the light falling upon it, or a photo resistance, serving to restrict the flow of current from another source such as a battery. The present construction is particularly suitable for use with a photo resistance, if desired, since a battery must be furnished in any event to supply current to the variable resistance 56, and this same battery may also supply current for a photo resistance. If a photocell, furnishing its own current, is preferred, then the circuit may be that illustrated in FIG. 5, where it is seen that the battery 58 is only in the circuit through the variable resistance 56 and is not included in the circuit through the photo element 26. If it is preferred to use a photo resistance rather than a photocell, then the battery 58 is simply placed in the return conductor going from the meter 34 to the switch 54, so that it will be effective to supply current when the photo element 26 is included in the effective circuit, and when the variable resistance 56 is included in the effective circuit in place of the photo element 26.

If the battery is to be used only for flash photographs (using a photocell rather than a photo resistance for daylight photographs) a longer operating life can be achieved if the battery is switched into the camera circuit only when the separate flash unit is plugged into the camera; or again, the separate battery as part of the camera can be dispensed with entirely, and current for flowing through the variable resistance 56 can be supplied from the electricity supply of the flashlight unit, taken off through a Zener diode.

Figure 6:
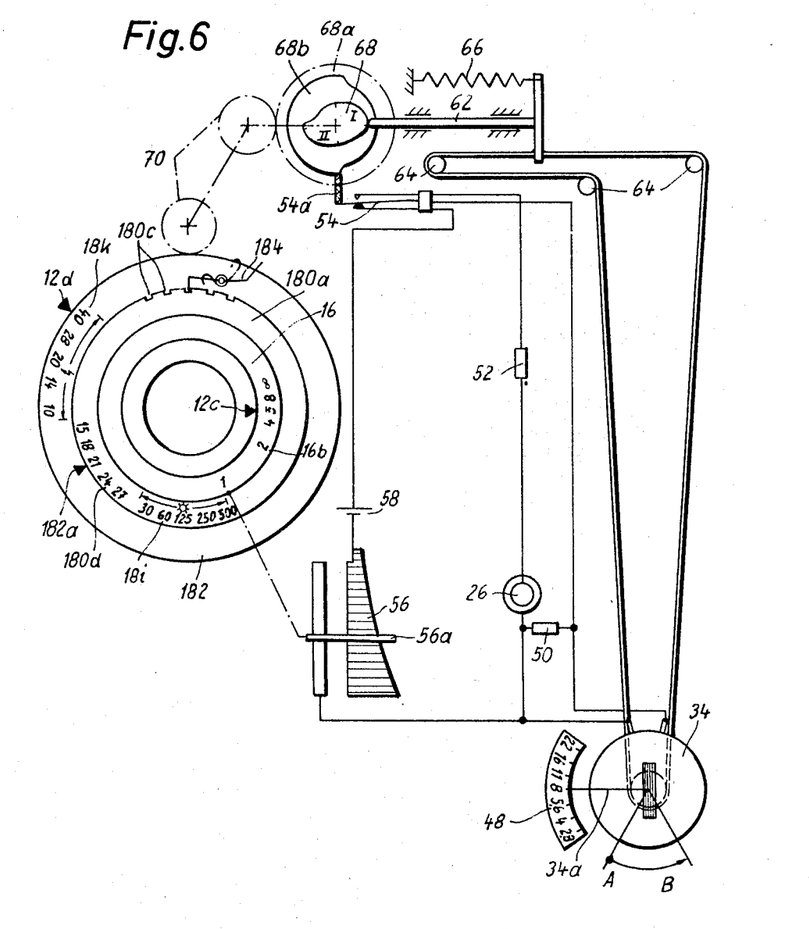
FIG. 6 is a view similar to FIG. 5, illustrating a second embodiment of the invention.
Figure 7:
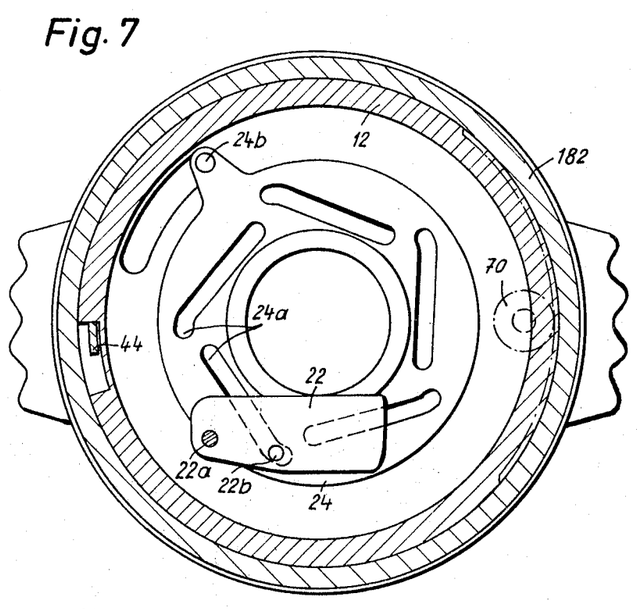
FIG. 7 is a view similar to FIG. 3, illustrating the second embodiment.
Figure 8:
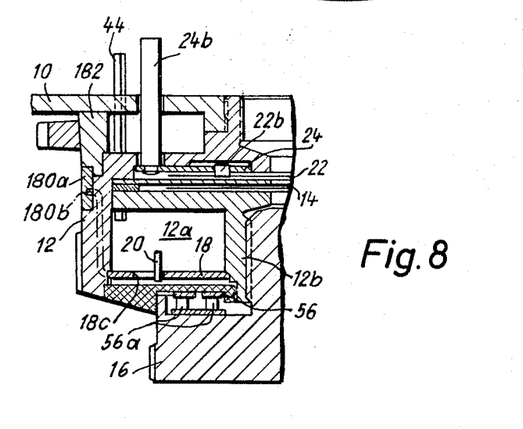
FIG. 8 is a view similar to FIG. 4, also illustrating the second embodiment.
Figure 9:
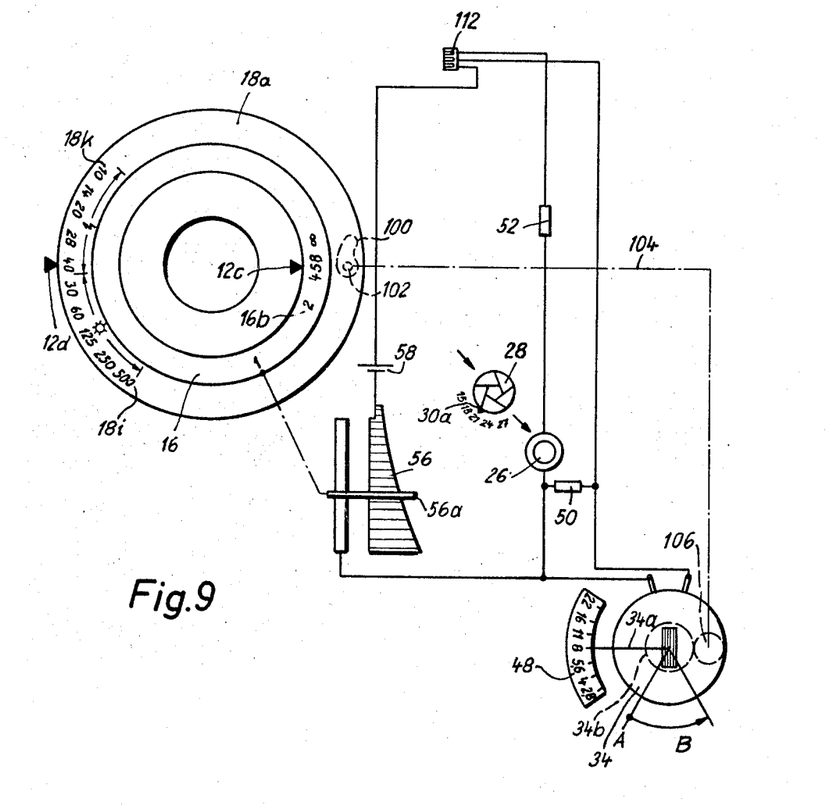
FIG. 9 is a combined wiring diagram and schematic view similar to FIGS. 5 and 6, illustrating a third embodiment of the invention.
Figure 10:
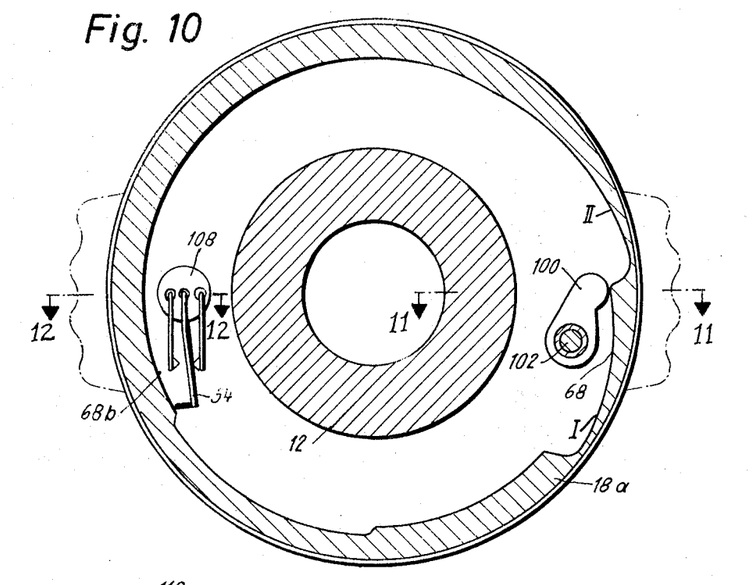
FIG. 10 is a transverse section through part of the shutter in the third embodiment.
Figure 11:
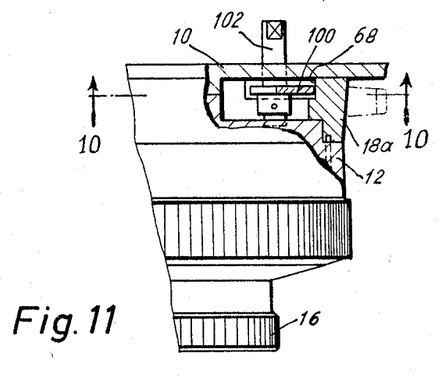
FIG. 11 is a fragmentary plan view, with parts broken away and parts in section, illustrating further details of the embodiment shown in FIGS. 9 and 10.
Figure 12:
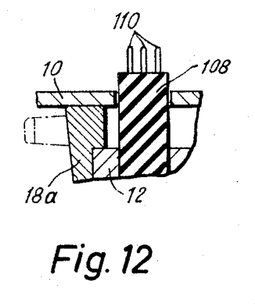
FIG. 12 is a fragmentary section taken approximately on the line 12—12 of FIG. 10.

A second embodiment of the invention is illustrated in FIGS. 6–8 of the drawings, to which reference is now made. Many of the parts in this second embodiment are substantially the same as those in the first embodiment, are indicated by the same reference numerals, and operate in substantially the same way, so that no further detailed description of such parts is needed, it being sufficient merely to point out the differences between the two embodiments.

In this second embodiment, the exposure setter 18a of the first embodiment is replaced by two adjusting members releasably coupled to each other to turn together but capable also of being adjusted relative to each other to a new position of relative orientation. In this way, the factor of film speed or sensitivity can be fed into the mechanism so that it is effective both when taking flashlight photographs and when taking daylight photographs.

In this second embodiment, the exposure time setting ring or shutter speed setting ring 180a is connected to the arm 180b of the internal shutter speed cam ring 18 which, as before, has a cam 18c operating upon the control pin 20 of the shutter delay or retarding mechanism. Thus the rotation of the ring 180a serves, just as before, to set the shutter speed, and it carries the shutter speed scale 18i. Mounted on the shutter casing coaxially with the ring 180a and preferably directly behind it, is an adjusting ring 182 carrying the flash guide member scale 18k. The ring 182 also carries a spring-biased coupling pawl 184 which engages in any one of a series of coupling notches 180c in the adjusting ring 180a. This releasable coupling means, shown schematically in the form of the pawl 184 cooperating with notches 180c, may in actual practice take the form shown in FIGS. 4 and 5 of Gebele Patent 3,044,376, granted July 17, 1962. The gear teeth cooperating with the gear transmission 70 are formed on the ring 182 rather than the ring 180a. The relative coupling positions of the two rings (that is, their orientation relative to each other) can be read by means of the film speed or film sensitivity scale 180d on the ring 180a, cooperating with a reference mark 182a on the ring 182.

In this second embodiment, the light restrictor 28 which was used in front of the photo element 26 in the first embodiment is entirely omitted. It is superfluous in the second embodiment because the factor of film sensitivity, fed into the system by the light restrictor 28 in the first embodiment, is now fed into the entire adjusting operation by additional turning of the exposure meter when the pawl 184 is released and the ring 182 is turned relative to the ring 180 to set a new film speed of film sensitivity on the scale 180d. Then when the two rings 180a and 182 are coupled again to each other, in a position of relative orientation which takes the film speed into account, the parts thereafter turn together when setting flash guide numbers for flash exposures or when setting shutter speeds for daylight exposures, as the case may be.

A third embodiment of the invention will now be described with reference to FIGS. 9–12 of the drawings. In this third embodiment, the rotation of the exposure meter when the shutter is set to different flash guide numbers or different shutter speeds is accomplished by a cam directly on the setting member, which cooperates with a control lever rigidly mounted on a shaft coupled to the drive for turning the exposure meter. The setting member 18a is formed with an internal cam 68 having two different ranges I and II controlling the turning of the exposure meter in the daylight range and in the flash exposure range, respectively. This cam 68 is engaged by a cam follower lever 100 rigidly mounted on the shaft 102 operatively connected to a drive indicated schematically at 104, which serves to drive a pinion 106 which meshes with a gear 34b secured to the housing 34 of the exposure meter. As the exposure setting member 18a is turned, the cam follower lever 100 is turned in one direction or the other by riding along the rise or fall of the cam 68, thereby turning the housing of the meter 34, through the transmission means 102, 104, 106. If necessary, a transmission stage can be incorporated in the transmission means 102, 104, so as to adapt the turning of the exposure meter housing to the graduations of the scales on the shutter.

In the embodiment illustrated, the setting ring 18a is arranged at the rear of the shutter (see FIG. 11) and the shaft 102 of the control lever 100 is mounted only at its forward end in the rear wall of the shutter housing 12, while the other bearing of this shaft 102 is formed by an opening in the front wall of the camera housing 10. Of course in a shutter construction in which the exposure setting member is at the front of the shutter rather than the rear, the control lever is arranged inside the shutter and its shaft is mounted completely within the shutter housing. If the construction is one in which there are two separate rings releasably coupled to each other, instead of the single setting ring 18a, to enable the setting mechanism to take into account the film speed (as in the second embodiment above described) when the control cam 68 which cooperates with the follower lever 100 will be formed on the film speed or sensitivity setting ring rather than on the shutter speed ring itself.

Advantageously, the switch 54 for switching from the photo element to the variable resistance or vice versa, is operated by another cam portion 68b formed interiorly on the ring 18a (or on the film speed setting ring, if there is a separate film speed setting ring releasably coupled to the shutter speed setting ring 18a). The two opposed contacts of this switch 54 are conveniently cast in an insulating piece 108 which is fitted in the rear wall of the shutter housing 12 in such a way that when the shutter is mounted on the front wall of the camera, the projecting connections 110 at the rear of the insulating piece 108 (see FIG. 12) will make electrical connection with an electrical plug or nipple 112 (see FIG. 9) mounted in the camera body and forming part of the electrical circuit. In this way, the electrical connections between the parts in the shutter housing and the parts in the camera housing are easily completed by the act of mounting the shutter in proper position on the front wall of the camera.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising an exposure setting member movable through one range to set the camera for a daylight exposure and movable through a different range to set the camera for a flash light exposure, a photoelectric exposure meter including a body rotatable as a unit and a movable member mounted on and movable with respect to said body, and diaphragm aperture setting means responsive to said movable member of said exposure meter for setting a diaphragm at an aperture determined by the position of said movable member, characterized by cam means operatively connected to said exposure setting member for causing rotation of said exposure meter body in accordance with changes in the setting of said exposure setting member, said cam means including two different ranges for causing rotation of said meter body during setting of said exposure setting member in its daylight exposure range and its flash light exposure range, respectively, the parts being so arranged that the position of said movable member of said exposure meter determines the diaphragm aperture setting during flash light exposures as well as during daylight exposures.

2. A construction as described in claim 1, wherein said movable member mounted on said meter body is operated by an electric circuit, said camera being further characterized by a photo element, and means operated by movement of said exposure setting member for operatively connecting said photo element into said circuit upon movement of said exposure setting member from its flash light exposure range to its daylight exposure range and for operatively disconnecting said photo element from said circuit upon movement of said exposure setting member from its daylight exposure range to its flash light exposure range.

3. A construction as described in claim 1, wherein said movable member mounted on said meter body is operated by an electric circuit, said camera being further characterized by a photo element, a variable resistance, and means operated by movement of said exposure setting member for operatively connecting said photo element into said circuit and operatively disconnecting said variable resistance from said circuit upon movement of said exposure setting member from its flash light exposure range to its daylight exposure range and for operatively disconnecting said photo element from said circuit and operatively connecting said variable resistance into said circuit upon movement of said exposure setting member from its daylight exposure range to its flash light exposure range.

4. A construction as defined in claim 1, in which said cam means for causing rotation of said exposure meter body includes a symmetrical heart cam.

5. A construction as defined in claim 1, in which said cam means for causing rotation of said exposure meter body includes a cam having an ascending part and a descending part, and in which, upon motion of said exposure setting member in one direction, the rotation of said exposure meter body is controlled by the ascending part of said cam while said exposure setting member is moving through one of its said ranges and by the descending part of said cam while said exposure setting member is moving through the other of its said ranges.

6. A photographic camera comprising an exposure setting member movable through one range to set the camera for a daylight exposure and movable through a different range to set the camera for a flash light exposure, a photoelectric exposure meter including a body rotatable as a unit and a movable member mounted on and movable with respect to said body, and diaphragm aperture setting means responsive to said movable member of said exposure meter for setting a diaphragm at an aperture determined by the position of said movable member, characterized by cam means operatively connected to said exposure setting member for causing rotation of said exposure meter body in accordance with changes in the setting of said exposure setting member, said cam means including two different ranges for causing rotation of said meter body during setting of said exposure setting member in its daylight exposure range and its flash light exposure range, respectively, said movable member mounted on said meter body being operated by an electric circuit, said camera being further characterized by a photo element, a variable resistance, means operated by movement of said exposure setting member for operatively connecting said photoelement into said circuit and operatively disconnecting said variable resistance from said circuit upon movement of said exposure setting member from its flash light exposure range to its daylight exposure range and for operatively disconnecting said photo element from said circuit and operatively connecting said variable resistance into said circuit upon movement of said exposure setting member from its daylight exposure range to its flash light exposure range, distance setting means, and means operated by movement of said distance setting means for varying the electrical resistance of said variable resistance.

7. A construction as defined in claim 6, in which said cam means for causing rotation of said exposure meter body includes a symmetrical heart cam.

8. A construction as defined in claim 6, in which said cam means for causing rotation of said exposure meter body includes a cam having an ascending part and a descending part, and in which, upon motion of said exposure setting member in one direction, the rotation of said exposure meter body is controlled by the ascending part of said cam while said exposure setting member is moving through one of its said ranges and by the descending part of said cam while said exposure setting member is moving through the other of its said ranges.

9. A photographic camera comprising an exposure setting member movable through one range to set the camera for a daylight exposure and movable through a different range to set the camera for a flash light exposure, a photoelectric exposure meter including a body rotatable as a unit and a movable member mounted on and movable with respect to said body, diaphragm aperture setting means responsive to said movable member of said exposure meter for setting a diaphragm at an aperture determined by the position of said movable member, and a movably mounted distance setter, characterized by an electric circuit for moving said movable member of said exposure meter, a photo element, a variable resistance element, first cam means operated by movement of said exposure setting member for rotating said exposure meter body, second cam means also operated by movement of said exposure setting member for rendering said photo element operative and said variable resistance element inoperative in said circuit when said exposure setting member is within its daylight exposure range and for rendering said photo element inoperative and said variable resistance element operative in said circuit when said exposure setting member is within its flash light exposure range, and means operated by movement of said distance setter for varying the resistance of said variable resistance element.

10. A construction as defined in claim 9, further characterized by the provision of a rotary carrier operatively connected to said exposure setting member to be turned thereby, said first cam means including a first cam mounted on and turning with said carrier, and said second cam means including a second cam also mounted on and turning with said carrier.

11. A construction as defined in claim 9, further characterized by the fact that said first cam means for rotating said exposure meter body includes a cam, a cam follower urged by a spring into contact with said cam, and a band connected to said cam follower to be moved thereby, said band extending around part of said exposure meter body in driving relation thereto.

12. A construction as defined in claim 11, in which said cam of said first cam means is in the form of a symmetrical heart cam and in which said cam follower engages the apex of said heart cam when said exposure setting member is in an intermediate position between its daylight exposure range and its flash light exposure range.

13. A construction as defined in claim 9, in which said exposure setting member has a shutter speed scale indicating the position of said setting member within its daylight exposure range and a flash guide number scale indicating the position of said setting member within its flash light exposure range, the two scales being arranged adjacent each other, and in which there is a common index mark with which the scales selectively cooperate.

14. A construction as defined in claim 9, in which said exposure setting member includes two setting elements releasably interconnected to each other for conjoint movement in a plurality of different adjusted positions with respect to each other, one of said setting elements operating said first cam means, the other of said setting elements serving to adjust the exposure speed of the camera.

15. A construction as defined in claim 14, in which one of said setting elements carries a film sensitivity scale cooperating with an index mark on the other of said setting elements, so that the two setting elements may be set in a position relative to each other which corresponds to the sensitivity of the film being used.

16. A construction as defined in claim 9, further characterized by the fact that said first cam means includes a cam portion formed directly on said exposure setting member, a shaft operatively connected to said rotatable body of said exposure meter, and a cam follower arm secured to said shaft and engaging said cam portion.

17. A construction as defined in claim 16, further characterized by the fact that said second cam means includes a second cam portion also formed directly on said exposure setting member, and a two-position electric switch operated by said second cam portion.

18. A construction as defined in claim 17, further characterized by the fact that said camera includes a camera body unit and a shutter unit normally mounted on said body unit, said electric circuit is located partly within said body unit, said two-position electric switch is mounted on said shutter unit, and there are cooperating electric connection parts on said body unit and shutter unit, respectively, for operatively connecting said electric switch into the part of said electric circuit which is in said body unit, by the act of mounting said shutter unit on said body unit.

References Cited by the Examiner

UNITED STATES PATENTS

| 3,082,671 | 3/1963 | Miyauchi | 95—10 |
| 3,162,111 | 12/1964 | Koppen et al. | 95—10 |

NORTON ANSHER, *Primary Examiner.*

C. B. PRICE, *Assistant Examiner.*